(12) United States Patent
Tangudu (10) Patent No.: US 11,289,985 B2
(45) Date of Patent: Mar. 29, 2022

(54) DUAL STATOR MACHINE WITH A ROTOR MAGNET SET CONFIGURED TO MINIMIZE FLUX LEAKAGE

(71) Applicant: Hamilton Sundstrand Corporation, Charlotte, NC (US)

(72) Inventor: Jagadeesh Kumar Tangudu, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 243 days.

(21) Appl. No.: 16/537,437

(22) Filed: Aug. 9, 2019

(65) Prior Publication Data

US 2021/0044187 A1  Feb. 11, 2021

(51) Int. Cl.
| | |
|---|---|
| *H02K 1/27* | (2006.01) |
| *H02K 16/04* | (2006.01) |
| *H02K 1/276* | (2022.01) |
| *H02K 1/30* | (2006.01) |
| *H02K 35/02* | (2006.01) |

(52) U.S. Cl.
CPC .......... *H02K 16/04* (2013.01); *H02K 1/2766* (2013.01); *H02K 1/30* (2013.01); *H02K 35/02* (2013.01)

(58) Field of Classification Search
CPC .......... H02K 1/27; H02K 1/2766; H02K 1/28; H02K 1/30; H02K 1/32; H02K 16/04; H02K 35/02; H02K 2213/03
USPC .............. 310/4, 6, 156.01–156.84, 112
See application file for complete search history.

(56) References Cited

U.S. PATENT DOCUMENTS

| | | | | |
|---|---|---|---|---|
| 4,689,973 A | * | 9/1987 | Hershberger | ........ H02K 1/2766 68/23.7 |
| 4,700,096 A | * | 10/1987 | Epars | ................... H02K 1/2773 310/153 |
| 5,773,910 A | * | 6/1998 | Lange | ..................... H02K 1/27 310/156.02 |

(Continued)

FOREIGN PATENT DOCUMENTS

| | | |
|---|---|---|
| JP | 2001145283 A | 5/2001 |
| JP | 2003319584 A | 11/2003 |

OTHER PUBLICATIONS

JP2003319584A Description English Translation.*
Extended European Search Report; Application No. 19215821.0; dated Jun. 30, 2020; 59 pages.

*Primary Examiner* — Maged M Almawri
(74) *Attorney, Agent, or Firm* — Cantor Colburn LLP (57) ABSTRACT

Disclose is a machine including: an inner stator having a plurality of radially outwardly extending teeth; an outer stator having a plurality of radially inwardly extending teeth that are offset from the radially outwardly extending teeth; a rotor including an extension between the plurality of stators, the extension including a plurality of rotor magnet slots and a plurality of flux barrier slots; the plurality of rotor magnet slots and the plurality of flux barrier slots contact one another and are arranged in a circumferentially alternating sequence, one after another, such that each of the rotor magnet slots is circumferentially bounded by a pair of the flux barrier slots; and a portion of each of the plurality of rotor magnet slots is disposed along a machine radial axis and/or a portion of each of the plurality of flux barrier slots is disposed at an angle to the machine radial axis.

19 Claims, 7 Drawing Sheets

(56) References Cited

U.S. PATENT DOCUMENTS

| | | | | |
|---|---|---|---|---|
| 5,783,893 A * | 7/1998 | Dade | H02K 16/00 | 310/114 |
| 6,323,572 B1 * | 11/2001 | Kinoshita | H02K 1/2766 | 310/156.07 |
| 6,459,185 B1 * | 10/2002 | Ehrhart | H02K 1/20 | 310/156.35 |
| 7,262,526 B2 * | 8/2007 | Shiga | H02K 1/2786 | 310/156.28 |
| 8,138,650 B2 * | 3/2012 | Shiga | H02K 1/2786 | 310/156.53 |
| 8,179,010 B2 * | 5/2012 | Ogami | H02K 1/2766 | 310/156.53 |
| 9,124,161 B2 * | 9/2015 | Kim | H02K 16/00 | |
| 9,595,858 B2 | 3/2017 | Lipo | | |
| 10,199,889 B2 * | 2/2019 | Piech | H02K 1/2786 | |
| 10,333,362 B2 * | 6/2019 | Lambert | H02K 3/18 | |
| 10,491,067 B2 * | 11/2019 | Fraser | H02K 7/14 | |
| 2001/0042983 A1 * | 11/2001 | Kinoshita | H02K 21/125 | 290/44 |
| 2003/0020351 A1 * | 1/2003 | Lee | H02K 1/246 | 310/156.53 |
| 2004/0108781 A1 * | 6/2004 | Razzell | H02K 7/11 | 310/112 |
| 2006/0103253 A1 * | 5/2006 | Shiga | H02K 1/2786 | 310/156.45 |
| 2007/0228858 A1 * | 10/2007 | Malmberg | H02K 1/2766 | 310/156.01 |
| 2009/0096314 A1 * | 4/2009 | Atarashi | H02K 16/02 | 310/209 |
| 2010/0011807 A1 * | 1/2010 | Nam | F04C 18/3564 | 62/510 |
| 2010/0017037 A1 * | 1/2010 | Nam | F25B 49/025 | 700/275 |
| 2010/0213885 A1 * | 8/2010 | Ichiyama | H02K 1/2766 | 318/720 |
| 2010/0259112 A1 * | 10/2010 | Chung | H02K 21/26 | 310/12.18 |
| 2011/0285238 A1 * | 11/2011 | Kusase | H02K 16/04 | 310/156.48 |
| 2011/0316366 A1 * | 12/2011 | Abbasian | H02K 19/32 | 310/46 |
| 2012/0128512 A1 | 5/2012 | Vande Sande et al. | | |
| 2012/0200187 A1 * | 8/2012 | Sano | H02K 1/2766 | 310/156.07 |
| 2012/0228965 A1 * | 9/2012 | Bang | F03D 9/25 | 310/12.18 |
| 2013/0093276 A1 * | 4/2013 | Kim | H02K 16/00 | 310/114 |
| 2013/0270955 A1 * | 10/2013 | Lillington | H02K 15/03 | 310/156.11 |
| 2013/0307363 A1 * | 11/2013 | Sano | H02K 1/27 | 310/156.01 |
| 2013/0342067 A1 * | 12/2013 | Jang | H02K 29/03 | 310/156.38 |
| 2014/0217859 A1 * | 8/2014 | Saito | B60L 50/61 | 310/68 D |
| 2015/0028710 A1 * | 1/2015 | Oka | H02K 15/03 | 310/156.48 |
| 2015/0042099 A1 * | 2/2015 | Muniz | H02K 1/28 | 290/55 |
| 2015/0048620 A1 * | 2/2015 | Muniz | H02K 1/32 | 290/55 |
| 2015/0236575 A1 * | 8/2015 | Walsh | H02K 16/02 | 310/156.07 |
| 2016/0126790 A1 * | 5/2016 | Piech | H02K 1/276 | 310/156.12 |
| 2018/0331591 A1 | 11/2018 | Liu | | |
| 2019/0103776 A1 | 4/2019 | Liu | | |

* cited by examiner

DUAL STATOR MACHINE WITH A ROTOR MAGNET SET CONFIGURED TO MINIMIZE FLUX LEAKAGE

BACKGROUND

Exemplary embodiments pertain to the art of machines and more specifically to a dual stator machine with a rotor magnet set configured to minimize flux leakage.

A Vernier machine (VM) is a type of synchronous reluctance machine where the rotor rotates relatively at a fraction of the angular velocity of the stator's rotating field. Torque is developed based on an interaction between a field created by current in stator windings and the magnetic flux from rotor mounted permanent magnets. In VMs, the machine torque steps up as the rotor speed steps down, creating an electric gearing effect. This makes the VM a useful topology for direct-drive applications. Direct-drives eliminate the need for gear boxes, which otherwise add to system complexity and reduce reliability due to increased parts.

BRIEF DESCRIPTION

Disclose is a machine comprising: an inner stator having a plurality of radially outwardly extending teeth; an outer stator having a plurality of radially inwardly extending teeth that are offset from the radially outwardly extending teeth; a rotor, the rotor including an extension disposed between the plurality of stators, the extension including a plurality of rotor magnet slots and a plurality of flux barrier slots, wherein plurality of rotor magnet slots and the plurality of flux barrier slots contact one another and are arranged in a circumferentially alternating sequence, one after another, such that each of the plurality of rotor magnet slots is circumferentially bounded by a pair of the plurality of flux barrier slots; and a portion of each of the plurality of rotor magnet slots is disposed along a machine radial axis and/or a portion of each of the plurality of flux barrier slots is disposed at an angle to the machine radial axis.

Further disclosed is a machine comprising: an inner stator having a plurality of radially outwardly extending teeth; an outer stator having a plurality of radially inwardly extending teeth that are offset from the radially outwardly extending teeth; a rotor, the rotor including an extension disposed between the plurality of stators, the extension including a plurality of rotor magnet slots and a plurality of flux barrier slots, wherein plurality of rotor magnet slots and the plurality of flux barrier slots contact one another and are arranged in a circumferentially alternating sequence, one after another, such that each of the plurality of rotor magnet slots is circumferentially bounded by a pair of the plurality of flux barrier slots, and each of the plurality of rotor magnet slots is disposed along an axis extending through a radial center of the machine.

In addition to one or more of the above disclosed aspects or as an alternate each of the plurality of flux barrier slots is disposed along the machine radial axis.

In addition to one or more of the above disclosed aspects or as an alternate the plurality of flux barrier slots and the plurality of magnet slots, together, form a saw tooth wave pattern, wherein: the plurality of magnet slots form wave drops and the plurality of flux barrier slots form wave ramps; or the plurality of magnet slots form wave ramps and the plurality of flux barrier slots form wave drops.

In addition to one or more of the above disclosed aspects or as an alternate the plurality of flux barrier slots are segmented, wherein one of an inner segment and an outer segment thereof is along the radial axis and the other of the inner segment and the outer segment is at an angle to the radial axis.

In addition to one or more of the above disclosed aspects or as an alternate the plurality of magnet slots are segmented, wherein one of an inner segment and an outer segment thereof is along the radial axis and the other of the inner segment and the outer segment is at an angle to the radial axis.

In addition to one or more of the above disclosed aspects or as an alternate each of the plurality of rotor magnet slots is disposed along the machine radial axis and each of the plurality of flux barrier slots is disposed at an angle to the machine radial axis.

In addition to one or more of the above disclosed aspects or as an alternate a flux barrier angle defines the angel to which the portion of each of the plurality of flux barrier slots is disposed relative to the machine radial axis, wherein the flux barrier angle in adjacent ones of the flux barrier slots is mutually different.

In addition to one or more of the above disclosed aspects or as an alternate each of the plurality of magnet slots and each of the plurality of flux barrier slots has a cross section that is rectangular in a machine circumferential-radial plane, wherein each of the plurality of magnet slots includes one of a plurality of rotor magnets.

In addition to one or more of the above disclosed aspects or as an alternate each of the plurality of stators includes a plurality of stator teeth that form a plurality of stator slots therebetween, and adjacent ones of the plurality of flux barrier slots are circumferentially spaced by a distance that is the smaller or greater than a circumferential span of any one of the plurality of stator teeth.

In addition to one or more of the above disclosed aspects or as an alternate the plurality of stator poles of one or both of the inner stator and the outer stator are formed by distributed windings that are wound through the plurality of stator slots and wound about the plurality of stator teeth.

In addition to one or more of the above disclosed aspects or as an alternate: the plurality of stators each include one of a plurality of yokes; and for one or both of the stators, the plurality of stator poles are wound through the plurality of stator slots, wound between the plurality of stator teeth, and wound about a respective one or both of the plurality of yokes.

In addition to one or more of the above disclosed aspects or as an alternate the plurality of stator poles that are wound about the respective one or both of the plurality of yokes are respectively wound through a plurality of frame slots of a frame disposed against the respective one or both of the plurality of yokes.

In addition to one or more of the above disclosed aspects or as an alternate the frame includes cooling channels and/or cooling fins configured to carry a cooling fluid.

In addition to one or more of the above disclosed aspects or as an alternate the plurality of stator poles that are wound about the respective one or both of the plurality of yokes are formed by concentrated windings.

In addition to one or more of the above disclosed aspects or as an alternate the rotor includes a plurality of pins extending in a motor axial direction between axially adjacent laminate layers of the rotor, each of the plurality of pins being disposed in one of the plurality of flux barrier slots.

In addition to one or more of the above disclosed aspects or as an alternate each of the plurality of pins is radially centered within the one of the plurality of flux barrier slots.

In addition to one or more of the above disclosed aspects or as an alternate each of the plurality of flux barrier slots includes one of the plurality of pins.

In addition to one or more of the above disclosed aspects or as an alternate a total number of the plurality of flux barrier slots is greater than a total number of the plurality of pins, and each of the plurality of flux barrier slots includes at most one pin.

Further disclosed is a method of minimizing magnetic flux leakage through a permanent magnet machine, comprising: generating a magnetic flux by directing a current between a plurality of inner stator poles and a corresponding plurality of outer stator poles in the machine, and through a plurality of rotor poles therebetween; and guiding the magnetic flux through the plurality of rotor poles utilizing a plurality of flux barrier slots, the plurality of rotor poles and the plurality of flux barrier slots arranged in a circumferentially alternating sequence, one after another, such that each of the plurality of rotor magnets is circumferentially bounded by a pair of the plurality of flux barrier slots, and a portion of one of the plurality of rotor magnets is disposed along a machine radial axis and/or a portion of the plurality of flux barrier slots is disposed at an angle to a machine radial axis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
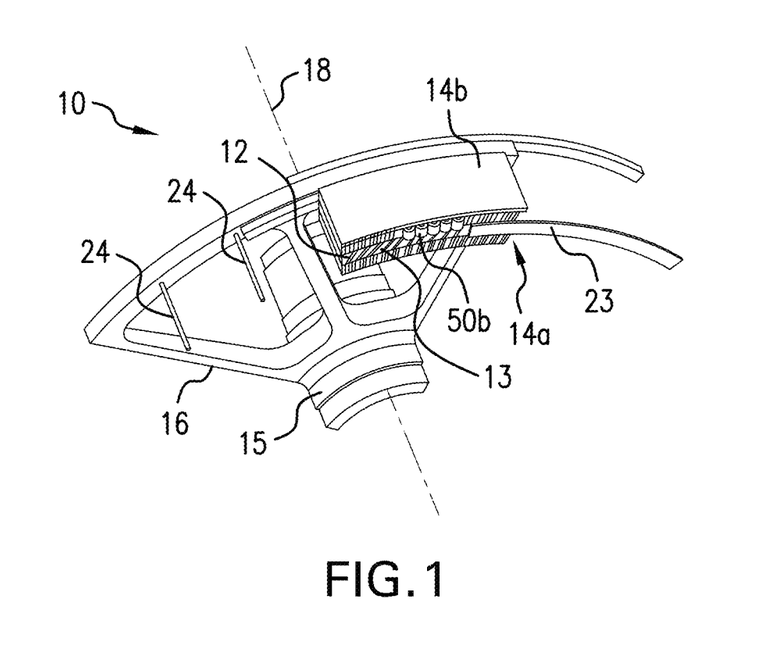
FIG. 1 is partial perspective view of an electric machine.

Referring to FIG. 1 an electric machine (machine) 10a is illustrated. The machine 10a includes a rotor 11 including a rotor magnet set 12 supported by a rotor body extension 13 that is annularly shaped. The rotor body extension 13 extends from a rotor support 15 that extends radially. The rotor support 15 is connected to a rotor shaft 15 that extends axially. The machine 10a includes and a plurality of stators 14 including an inner stator 14a and an outer stator 14b. The machine 10a may be operated as an electric motor, or as an electric generator.

Generally, the rotor body extension 13 and the stators 14 are concentric and axially-aligned relative to an axial centerline 18 of the machine 10. The rotor 11 rotates relative to the stators 14 which are positionally-fixed to a housing (not shown) of the machine 10. In particular, the rotor body extension 13 is positioned concentrically between the inner stator 14a and the outer stator 14b. The rotor magnet set 12 is positioned within the rotor body extension 13, axially between an annularly-shaped, electrically non-conductive end ring (end ring) 23 and an annularly-shaped, electrically non-conductive separator (separator) 26. The separator 26 is positioned axially between the rotor magnet set 12 and the rotor support 16. The rotor magnet set 12, the end ring 23, and the separator 26 are attached to the rotor support 16 using pins 24 in one embodiment.

Figure 2:
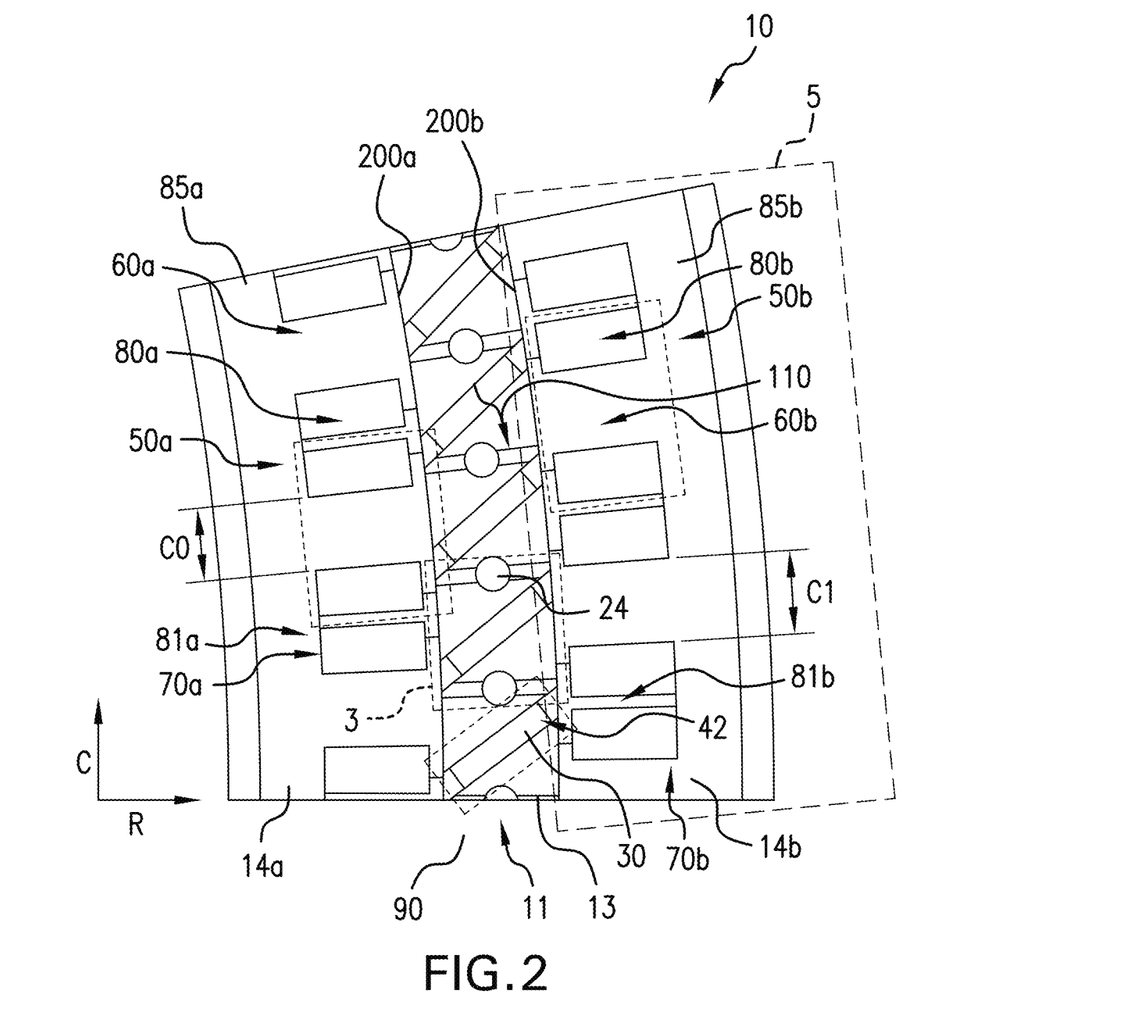
FIG. 2 is a partial cross-section of a portion of an electric machine according to a disclosed embodiment.

FIG. 2 illustrates a machine 10a according to a disclosed embodiment. The machine may 10a be a Vernier machine in one embodiment. Performance of the machine 10a may depend, at least in part, on the interaction of a rotor 11 with the stators 14. This interaction creates magnetic flux from a magnetic field generated between the rotor 11 and the stators 14. Thus, as described below, machine 10a is configured to minimize magnetic flux leakage from air gaps between the stators 14 and the rotor magnet set 12. According to the disclosure, minimizing flux leakage is equivalent to maximizing flux linkage in the machine 10a. This configuration minimizes a power factor reduction that could otherwise occur. Specifically, the utilization of a plurality of flux barriers 110 between magnets in the rotor 11 that are adjacent in a circumferential direction C to each of a plurality of rotor magnets 30 provide a configuration in which leakage of magnetic flux is through the machine 10a is minimized.

The rotor magnet set 12 includes a plurality of permanent magnets (PMs) generally referred to as 30. In FIG. 2 one of the plurality of PMs 30 is identified. The plurality of PMs 30 are positionally-fixed relative to the rotor 11.

In one embodiment, some or all of the plurality of PMs 30 are rectangular in cross-section in the circumferential-radial (C-R) plane illustrated in FIG. 2. Each of the plurality of PMs 30 extend substantially a complete radial span R of the rotor body 13. The rotor body 13 includes a plurality of circumferentially-spaced magnet slots generally referred to as 42. In. FIG. 2, one of the plurality of magnet slots 42 is identified. The plurality of PMs 30 are disposed within the respective plurality of slots 42 so as to be positionally-fixed relative to the rotor 11.

The PMs 30 collectively generate a rotor magnetic field. At least a portion of the rotor magnetic field extends in the radial direction R to interact with the stators 14. The rotor magnetic field rotates relative to the stators 14 during operation of the machine 10.

As illustrated in FIG. 2, the machine 10a includes a plurality of stator poles generally referred to as 50. A plurality of inner stator poles 50a are disposed at the inner stator 14a. One of the plurality of inner stator poles 50a is identified in FIG. 2. A plurality of outer stator poles 50b (illustrated in FIG. 1) are disposed at the outer stator 14b. One of the plurality of outer stator poles 50b is identified in FIG. 2. The outer stator poles 50b are circumferentially offset from the inner stator poles 50a.

The stators 14 include a plurality of stator teeth generally referred to as 60. A plurality of inner of stator teeth 60a are disposed on the inner stator 14a. One of the plurality of inner stator teeth 60a is identified in FIG. 2. A plurality of outer stator teeth 60b are disposed on the outer stator 14b. One of the plurality of outer stator teeth 60a is identified in FIG. 2.

The stators 14 further include a plurality of stator slots generally referred to as 70, between adjacent ones of the plurality of stator teeth 60. A plurality of inner stator slots 70a is disposed on the inner stator 14a. One of the plurality of inner stator slots 70a is identified in FIG. 2. A plurality of outer stator slots 70b is disposed on the outer stator 14b. One of the plurality of inner stator slots 70b is identified in FIG. 2.

As indicated above, the inner stator poles 50a and outer stator poles 50b are circumferentially offset. To achieve this, the stators 14 may be circumferentially offset so that the inner plurality of stator teeth 60a are aligned with the outer plurality of stator slots 70b.

In one embodiment the machine 10a is a three phase machine. The plurality of stator poles 50 are therefore defined by three sets of coil windings (windings) 80 in each of the inner stator 14a and outer stator 14b. The inner stator 14a includes inner windings 80a. One segment of the inner windings 80a wound through one of the inner stator slots 70 is identified in FIG. 2. The outer stator 14b includes outer windings 80b. One segment of the outer windings 80b wound through one of the outer stator slots 70b is identified in FIG. 2.

The stators 14 each include one of a plurality of yokes 85 including an inner yoke 85a on the inner stator and an outer yoke 85b on the outer stator 14b.

Figure 6:
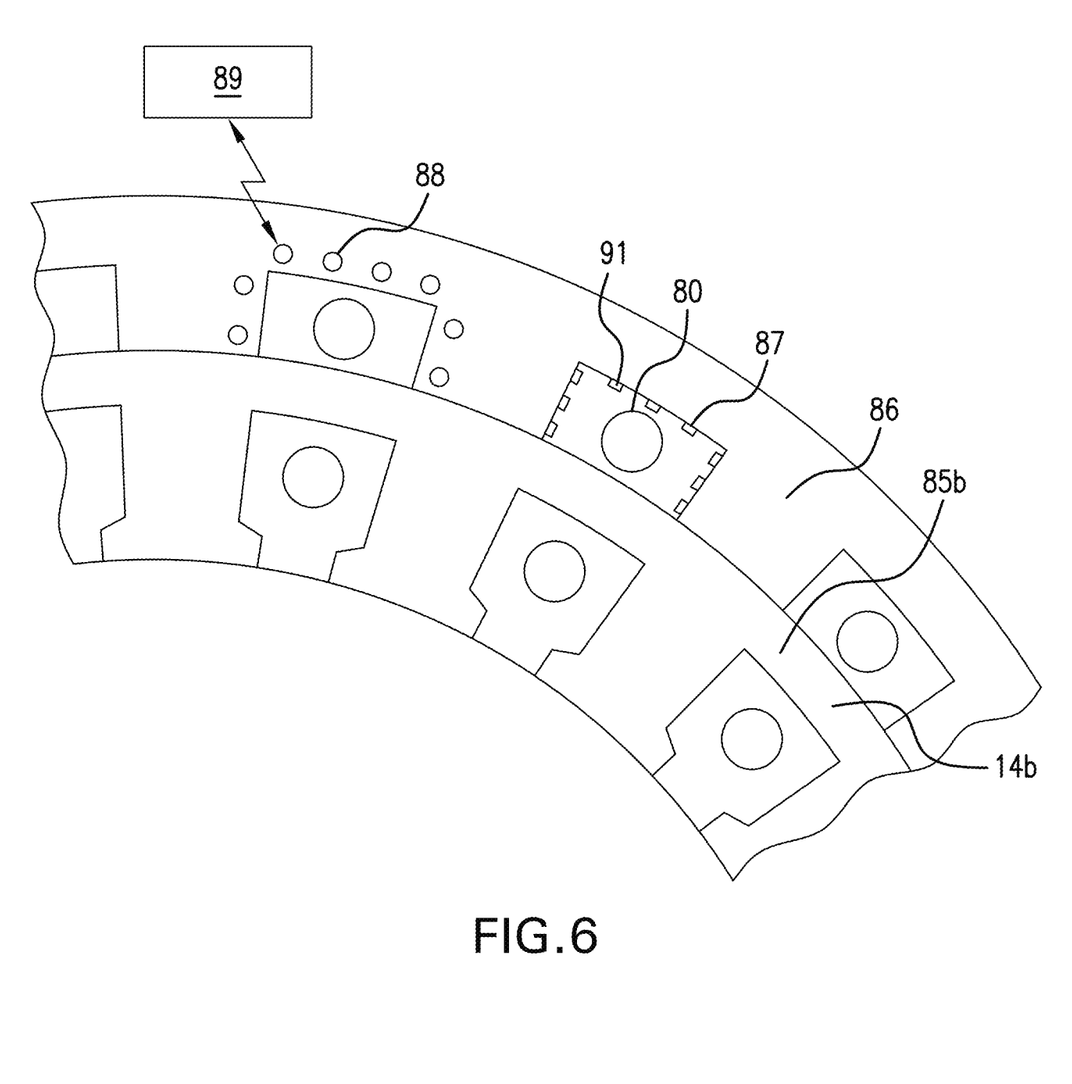
FIG. 6 shows an alternate machine to that illustrated in FIGS. 2-4, illustrating a different configuration for machine windings about an outer stator yoke, wherein features not illustrated are the same as those illustrated in FIGS. 2-3.

It is to be appreciated that the windings 80 may be spun around the teeth 60 or around the yokes 85. When spun about the teeth 60, each of the slots 70 will have windings from two stator poles therein (FIG. 2). When spun about the yokes 85, each of the slots 70 will have windings from one stator pole therein (FIG. 6, discussed below). In one embodiment, inner windings 80a may be spun around the inner teeth 60 and the outer stator windings 80b may be spun around the outer stator yoke 85b. This combination may be reversed.

In the embodiment of FIG. 2, the stators 14 may include a plurality of thermal barriers generally referred to as 81 within the slots 70 between windings 80 from different stator poles. The inner stator 14a may include a plurality of inner thermal barriers 81a. One of the plurality of inner thermal barriers 81a is identified in FIG. 2. The outer stator 14b may include an outer plurality of thermal barriers 81b. One of the plurality of outer thermal barriers 81b is identified in FIG. 2.

In one embodiment, one or both of the inner plurality of windings 80a and the outer plurality of windings 80b are not concentrated windings and are instead distributed windings, and for example, lap windings.

As indicated above, the rotor magnet set 12 includes a plurality of PMs 30, defining a respective plurality of rotor poles generally referred to as 90. One of the plurality of rotor poles 90 is identified in FIG. 2. A total number of PMs 30 is greater than a total number of either of the inner stator poles 50a or outer stator poles 50b.

The rotor body 13 includes a plurality of flux barrier slots generally referenced as 110. One of the plurality of flux barrier slots 110 is identified in FIG. 2. The flux barrier slots 110 are distributed circumferentially. The magnet slots 42 and the flux barrier slots 110 are arranged in a circumferentially alternating sequence, one after another. From this configuration, each of the plurality of magnet slots 30 is circumferentially bounded by a circumferentially adjacent pair of the plurality of flux barriers 110.

The flux barrier slots 110 are rectangular in the circumferential-radial plane and span substantially a complete radial span R of the rotor body 13. A circumferential spacing between adjacent ones of the plurality of flux barrier slots 110 C0 is less than or greater than a circumferential span C1 of ones of the plurality of stator teeth 60 (C0>C1).

A first air gap 200a of a plurality of air gaps generally referenced as 200 is formed between the inner stator 14a and the rotor body extension 13. A second air gap 200b is formed between the outer stator 14b and the rotor body extension 13. The flux barrier slots 110 are each thicker than a summation of two times these two different air gaps 200. This provides a greater path of resistance to flux travel therethrough than between the windings 80, the stators 14 and the rotor magnet set 12. If the spacings are irregular about the machine 10, then the flux barrier slots 110 are each thicker than a summation of two times the largest distances between (i) the rotor boy extension 13 and the inner stator 14a and (ii) the rotor body extension 13 and the outer stator 14b.

The rotor magnet set 12, as indicated, includes the plurality of pins 24 extending in a motor axial direction, normal to the circumferential-radial plane, between axially adjacent laminate layers of the rotor body extension 13. Each of the plurality of pins 24 is disposed in one of the plurality of flux barrier slots 110. In one embodiment each of the plurality of pins 24 is radially centered within the flux barrier slots 110. In one embodiment each of the plurality of flux barrier slots 110 includes one of the plurality of pins 24.

Figure 3:
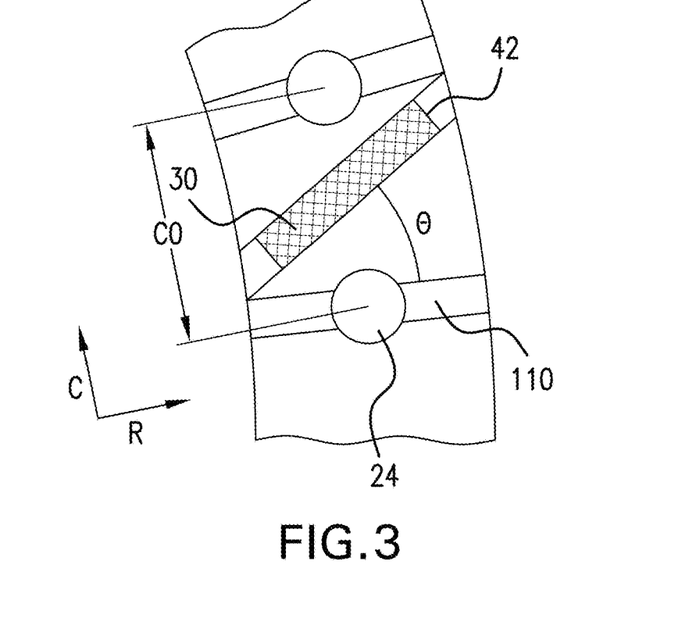
FIG. 3. shows a portion of the electric machine illustrated in FIG. 2, showing a configuration of the permanent magnets and flux barriers.

FIG. 3 is an enlarged view of the section 3 of the rotor FIG. 3 illustrates one of the plurality of PMs 30 in one of the plurality of magnet slots 42 bounded by a pair of the flux barrier slots 110. One of the flux barrier slots 110, with one of the pins 24 therein, is labeled in FIG. 3. It shall be understood that the teachings related to the illustrated one of the PMs 30 can be applied to some or all of the plurality of PMs 30.

In FIG. 3, each of the plurality of flux barriers slots 110 is disposed along the machine radial axis R. Each of the plurality of magnet slots 42 spans a circumferential space between adjacent ones of the plurality of flux barriers 110. Due to the circumferential spacing C0 between adjacent flux barrier slots 110, each of the plurality of magnet slots 42 is disposed at a flux barrier angle (Theta) to the machine radial axis R. By this configuration, the plurality of PMs 30 are disposed at the flux barrier angle (Theta) to the machine radial axis R. In one embodiment, the flux barrier angle changes between circumferentially adjacent pairs of flux barrier slots 110. In such embodiments, either the magnet slots 42 adjust in length to maintain a distance C0 between a radial center of the flux barrier slots 110, or the flux barrier slots 110 are relocated circumferentially.

As illustrated in FIG. 3, the plurality of flux barrier slots 110 and the plurality of magnet slots 42, together, form a saw tooth wave pattern. In the wave pattern illustrated in FIG. 3, the plurality of magnet slots 42 form wave ramps and the plurality of flux barrier slots 30 form wave drops.

Figure 4:
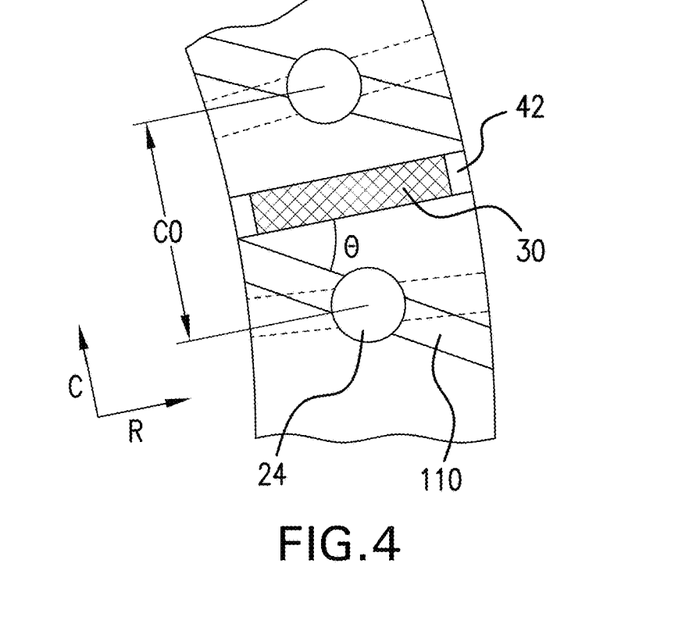
FIG. 4. shows an alternate machine to that illustrated in FIGS. 2-3, illustrating a different configuration of the permanent magnets and flux barriers, wherein features not illustrated are the same as those illustrated in FIGS. 2-3.

FIG. 4 shows an alternate machine wherein each feature of the machine is the same that illustrated in FIGS. 1-2 except for the configuration of the rotor magnet set 12 as shown. As with FIG. 3, the illustration of FIG. 4 is an enlarged view of the section 3 of the machine (see of FIG. 2). In addition, as with FIG. 3, the illustration of FIG. 4 shows one of the plurality of PMs 30 within one of the plurality of magnet slots 42 bounded by a pair of the plurality of flux barriers 110. One of the flux barrier slots 110, with one of the pins 24 therein, is labeled in FIG. 4.

In the embodiment of FIG. 4, the plurality of magnet slots 42 extend along the machine radial axis R. By this configuration, the plurality of PMs 30 are disposed along the machine radial axis R. Each of the plurality of flux barrier slots 110 spans a circumferential space between adjacent ones of the plurality of magnet slots 42. Due to the circumferential spacing C0 between adjacent flux barrier slots 110, each of the plurality of flux barrier slots 110 is disposed at the flux barrier angle (Theta) to the machine radial axis R. In one embodiment, the flux barrier angle changes between circumferentially adjacent pairs of flux barrier slots 110. In such embodiments, either the flux barrier slots 110 adjust in length to maintain a distance C0 between a radial center of the flux barrier slots 110, or the flux barrier slots 110 are relocated circumferentially.

As illustrated in FIG. 4, the plurality of flux barrier slots 110 and the plurality of magnet slots 42, together, also form a saw tooth wave pattern. In the wave pattern illustrated in FIG. 4, the plurality of magnet slots 42 form wave drops and the plurality of flux barrier slots 30 form wave ramps.

In each of the configurations of FIGS. 3 and 4, the adjacent ones of the flux barriers 110 are circumferentially spaced and do not overlap one another. Adjacent ones of the magnet slots 42 are circumferentially spaced and do not overlap one another. From this configuration, adjacent ones of the PMs 30 are circumferentially spaced and do not overlap one another. Each of these configurations provide for an adequate reduction of flux leakage in accordance with the disclosed embodiments.

FIGS. 5A-5D show alternative configurations to that of FIGS. 3 and 4.

Figure 5A:
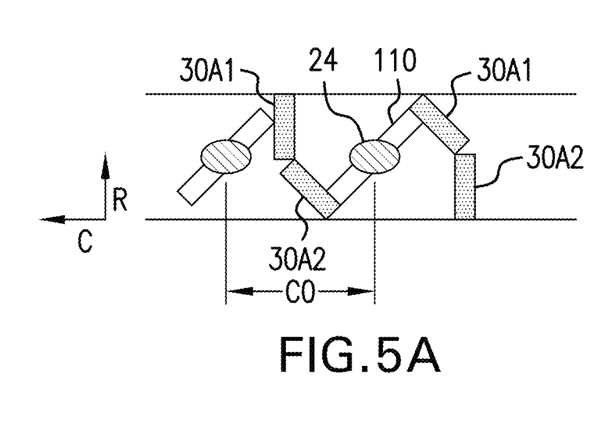
FIGS. 5A-5D show alternate machine configurations for the permanent magnets and flux barriers, wherein features not illustrated are the same as those illustrated in FIGS. 2-3.
Figure 5B:
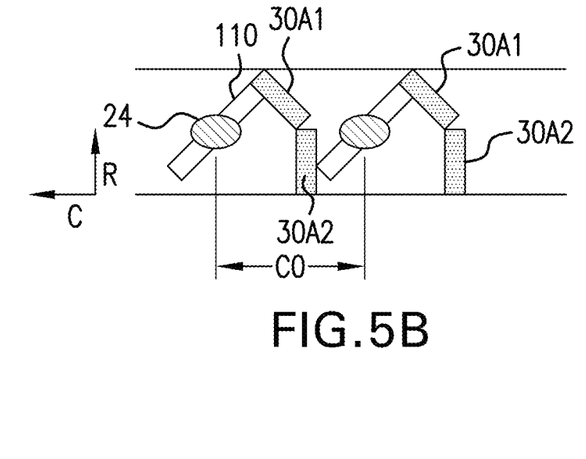

In FIGS. 5A and 5B the magnets are configured in segmented portions, in segmented magnet slots (not illustrated) having a substantially same shape as the magnets, in the radial direction. There are least two magnets 30A1 and 30A2 between each circumferentially adjacent set of flux barrier slots 110. One of the magnet segments 30A1 or 30A2 between each of the flux barrier slots 110 is along the radial axis R. Another one of the magnet segments 30A1 and 30A2 is at an angle to the radial axis R. In the illustrations each of the flux barrier slots 110 includes a pin 24 and are separated by a circumferential spacing C0.

In FIG. 5A, in circumferentially adjacent pairs of radial outer magnets segments 30A1, one of which is angularly skewed relative to the radial axis and another of which is aligned with the radial axis. In circumferentially adjacent pairs of radial inner magnets segments 30A2, one of which is angularly skewed relative to the radial axis and another of which is aligned with the radial axis.

In FIG. 5B, in circumferentially adjacent pairs of radial outer magnets segments 30A1, both of which are angularly skewed relative to the radial axis. In circumferentially adjacent pairs of radial inner magnets segments 30A2, both of which are is aligned with the radial axis.

Figure 5C:
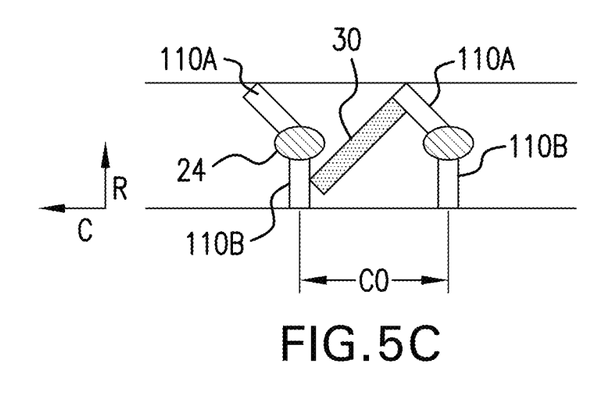
Figure 5D:
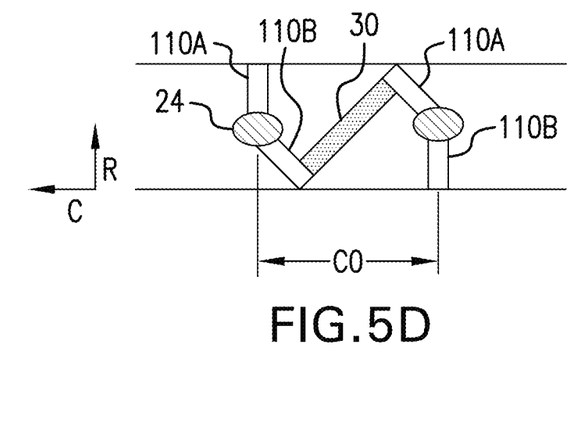

In FIGS. 5C and 5D the flux barrier slots are configured in segmented portions in the radial direction. There are least two flux barrier slots 110A and 110B between each circumferentially adjacent set of magnets 30. One of the flux barrier slots 110A or 110B between each of the magnets 30 is along the radial axis R. Another one of the flux barrier slots 110A or 110B is at an angle to the radial axis R. In the illustrations each of the flux barrier slots 110 includes a pin 24 and are separated by a circumferential spacing C0.

In FIG. 5A, in circumferentially adjacent pairs of radial outer flux barrier slots 110a, one of which is angularly skewed relative to the radial axis and another of which is aligned with the radial axis. In circumferentially adjacent pairs of radial inner flux barrier slots 110B, one of which is angularly skewed relative to the radial axis and another of which is aligned with the radial axis.

In FIG. 5A, in circumferentially adjacent pairs of flus barrier slots segments 110A, both of which are angularly skewed relative to the radial axis. In circumferentially adjacent pairs of radial inner flux barrier slots 110B, both of which are is aligned with the radial axis.

FIG. 6 shows an alternate machine wherein each feature of the machine is the same that illustrated in FIGS. 1-2 except for the configuration of the windings about the outer stator 14b. FIG. 6 is a section of the machine that would be obtained from section boarder 5-5 of FIG. 2. As illustrated in FIG. 6, windings about the outer stator 14b are wound about the outer yoke 85b, though winding about the inner yoke 85a as an alternative or in addition thereto is within the scope of the disclosure. Windings about the outer yoke 85b may be concentrated. As illustrated in FIG. 6, a conductive frame (frame) 86 may be provided against the outer yoke 85b. The frame 86 may include a plurality of frame slots 87, each for positioning one of the windings 80 therein against the outer yoke 85b. The frame 86 may include cooling channels 88 disposed about each of the plurality of frame slots 87. A thermal management system 89, illustrated schematically, may transport cooling fluid through the cooling channels 88 to reduce heat stress in the armature from utilization of the windings 80. In one embodiment cooling fins 91 are provided in addition to or instead of cooling channels 88.

Figure 7:
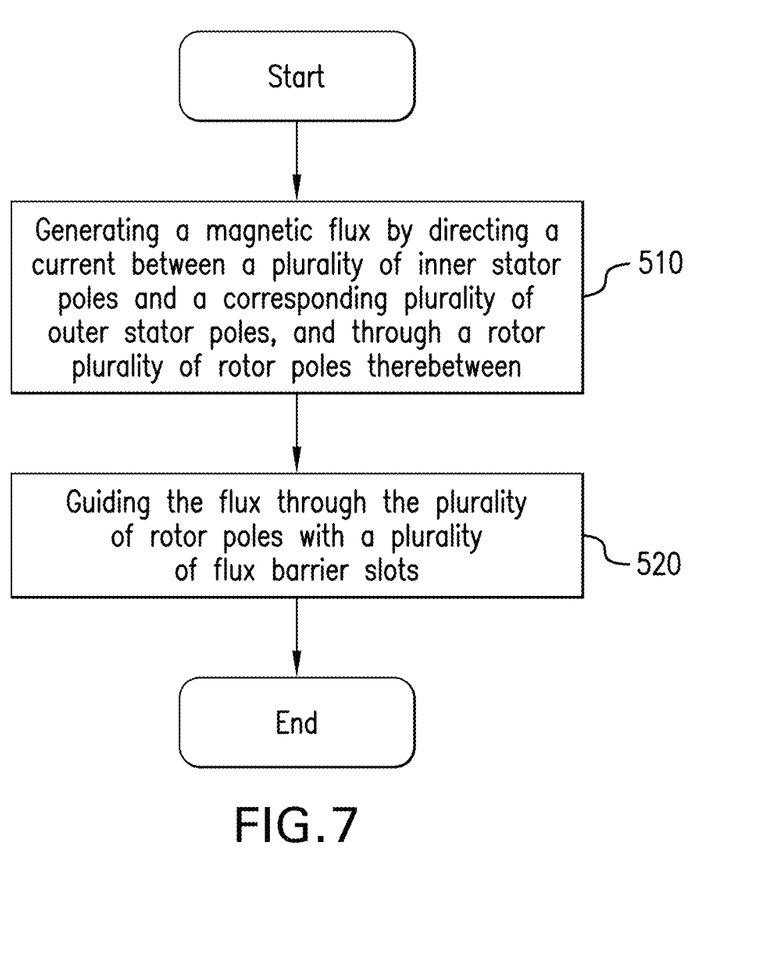
FIG. 7 is a flow diagram illustrating a process of minimizing flux leakage in the machine illustrated in FIGS. 2-3.
Figure 8:
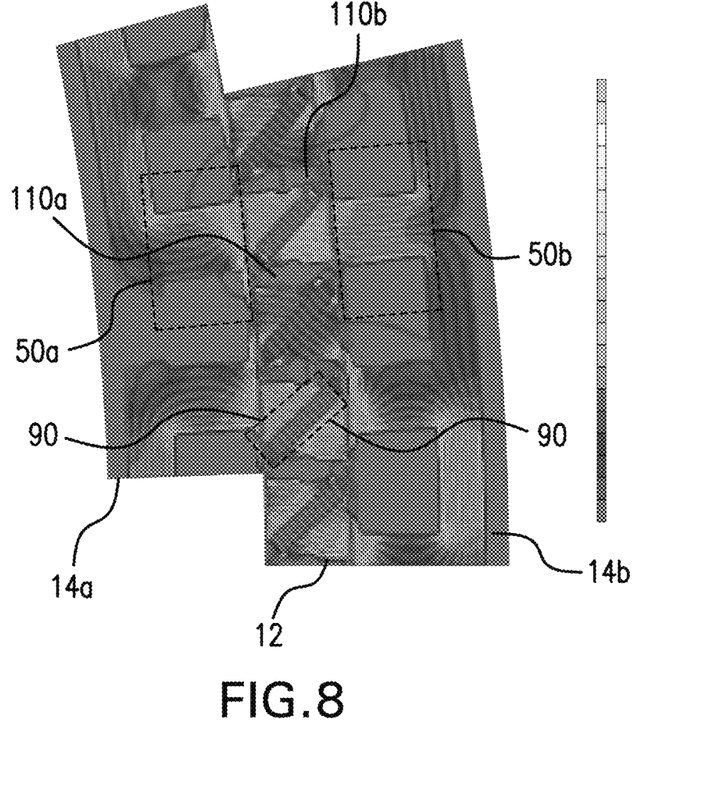
FIG. 8 illustrates flux lines the machine of FIGS. 2-3 executing the process of FIG. 7.

Turning to FIG. 7 a method of minimizing magnetic flux leakage through a permanent magnet machine (machine) 10a is shown and the effect of the method is illustrated in FIG. 8. As illustrated in block 510, the method includes generating a magnetic flux by directing a current between a plurality of inner stator poles 50a and a corresponding plurality of outer stator poles 50b, and through a plurality of rotor poles 90 therebetween. As illustrated in block 520 the method includes guiding the flux through a plurality of rotor poles 90 with a plurality of flux barrier slots 110. As indicated, the plurality of flux barrier slots 110 circumferentially bound the plurality of rotor poles 90. One or both of the plurality of rotor poles 90 and the plurality of flux barriers 110 is disposed at an angle to a machine radial axis.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A machine comprising:
an inner stator having a plurality of radially outwardly extending teeth;
an outer stator having a plurality of radially inwardly extending teeth that are offset from the radially outwardly extending teeth;
a rotor, the rotor including an extension disposed between the plurality of stators, the extension including a plurality of rotor magnet slots and a plurality of flux barrier slots,
wherein plurality of rotor magnet slots and the plurality of flux barrier slots contact one another and are arranged in a circumferentially alternating sequence, one after another, such that each of the plurality of rotor magnet slots is circumferentially bounded by a pair of the plurality of flux barrier slots; and
a portion of each of the plurality of rotor magnet slots is disposed along a machine radial axis and/or a portion of each of the plurality of flux barrier slots is disposed at an angle to the machine radial axis,
wherein:
the rotor includes a plurality of pins extending in a motor axial direction between axially adjacent laminate layers of the rotor, each of the plurality of pins being disposed in one of the plurality of flux barrier slots; and
each of the plurality of pins is radially centered within the one of the plurality of flux barrier slots.

2. The machine of claim 1, wherein each of the plurality of flux barrier slots is disposed along the machine radial axis.

3. The machine of claim 1, wherein the plurality of flux barrier slots and the plurality of magnet slots, together, form a saw tooth wave pattern, wherein:
the plurality of magnet slots form wave drops and the plurality of flux barrier slots form wave ramps; or
the plurality of magnet slots form wave ramps and the plurality of flux barrier slots form wave drops.

4. The machine of claim 1, wherein the plurality of flux barrier slots are segmented, wherein one of an inner segment and an outer segment thereof is along the radial axis and the other of the inner segment and the outer segment is at an angle to the radial axis.

5. The machine of claim 1, wherein the plurality of magnet slots are segmented, wherein one of an inner segment and an outer segment thereof is along the radial axis and the other of the inner segment and the outer segment is at an angle to the radial axis.

6. The machine of claim 1, wherein a flux barrier angle defines the angel to which the portion of each of the plurality of flux barrier slots is disposed relative to the machine radial axis, wherein the flux barrier angle in adjacent ones of the flux barrier slots is mutually different.

7. The machine of claim 1, wherein each of the plurality of flux barrier slots includes one of the plurality of pins.

8. The machine of claim 1, wherein a total number of the plurality of flux barrier slots is greater than a total number of the plurality of pins, and each of the plurality of flux barrier slots includes at most one pin.

9. The machine of claim 1, wherein each of the plurality of magnet slots and each of the plurality of flux barrier slots has a cross section that is rectangular in a machine circumferential-radial plane, wherein each of the plurality of magnet slots includes one of a plurality of rotor magnets.

10. The machine of claim 9, wherein each of the plurality of stators includes a plurality of stator teeth that form a plurality of stator slots therebetween, and adjacent ones of the plurality of flux barrier slots are circumferentially spaced by a distance that is the smaller or greater than a circumferential span of any one of the plurality of stator teeth.

11. The machine of claim 10, wherein the plurality of stator poles of one or both of the inner stator and the outer stator are formed by distributed windings that are wound through the plurality of stator slots and wound about the plurality of stator teeth.

12. The machine of claim 10, wherein:
the plurality of stators each include one of a plurality of yokes; and
for one or both of the stators, the plurality of stator poles are wound through the plurality of stator slots, wound between the plurality of stator teeth, and wound about a respective one or both of the plurality of yokes.

13. The machine of claim 12, wherein the plurality of stator poles that are wound about the respective one or both of the plurality of yokes are respectively wound through a plurality of frame slots of a frame disposed against the respective one or both of the plurality of yokes.

14. The machine of claim 13, wherein the frame includes cooling channels and/or cooling fins configured to carry a cooling fluid.

15. The machine of claim 13, wherein the plurality of stator poles that are wound about the respective one or both of the plurality of yokes are formed by concentrated windings.

16. A machine comprising:
an inner stator having a plurality of radially outwardly extending teeth;
an outer stator having a plurality of radially inwardly extending teeth that are offset from the radially outwardly extending teeth;
a rotor, the rotor including an extension disposed between the plurality of stators, the extension including a plurality of rotor magnet slots and a plurality of flux barrier slots,
wherein plurality of rotor magnet slots and the plurality of flux barrier slots contact one another and are arranged in a circumferentially alternating sequence, one after another, such that each of the plurality of rotor magnet slots is circumferentially bounded by a pair of the plurality of flux barrier slots, and
each of the plurality of rotor magnet slots is disposed along an axis extending through a radial center of the machine,
wherein:
the rotor includes a plurality of pins extending in a motor axial direction between axially adjacent laminate layers of the rotor, each of the plurality of pins being disposed in one of the plurality of flux barrier slots; and
each of the plurality of pins is radially centered within the one of the plurality of flux barrier slots.

17. The machine of claim 16, wherein each of the plurality of rotor magnet slots is disposed along the machine radial axis and each of the plurality of flux barrier slots is disposed at an angle to the machine radial axis.

18. The machine of claim 16, wherein each of the plurality of flux barrier slots includes one of the plurality of pins.

19. The machine of claim 16, wherein a total number of the plurality of flux barrier slots is greater than a total number of the plurality of pins, and each of the plurality of flux barrier slots includes at most one pin.

\* \* \* \* \*